United States Patent Office
3,038,893
Patented June 12, 1962

3,038,893
DIAZO DYES CONTAINING A DIHALOGENO TRIAZINE SUBSTITUENT
Herbert Francis Andrew, Manchester, England, assignor to Imperial Chemical Industries Limited, London, England, a corporation of Great Britain
No Drawing. Filed Nov. 16, 1959, Ser. No. 852,982
Claims priority, application Great Britain Nov. 28, 1958
4 Claims. (Cl. 260—146)

This invention relates to new azo dyestuffs and more particularly it relates to new water-soluble azo dyestuffs which are valuable for colouring cellulose textile materials.

According to the invention there are provided the new azo dyestuffs which, in the form of the free acids, are represented by the formula:

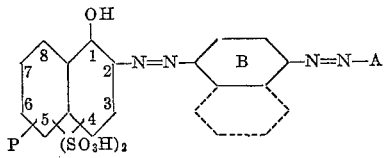

wherein A represents an aryl radical which does not contain a hydroxy group in an ortho position to the azo link, P represents a group of the formula:

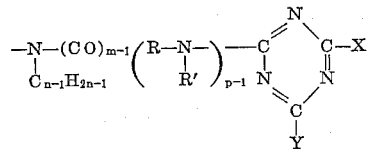

which is attached to the 6- or 7-position of the naphthalene nucleus, R represents a substituted or unsubstituted phenylene radical, R' represents a hydrogen atom or an alkyl radical, X represents a chlorine or a bromine atom, Y represents a chlorine or a bromine atom or an alkoxy, alkyl, aryl, aryloxy, arylmercapto or alkylmercapto radical, or a thiocyano, amino or substituted amino group, $m$ and $p$ each represent 1 or 2 and may be the same or different provided that $m$ is not 2 when $p$ is 1, $n$ represents a whole number and the phenylene or naphthylene radical represented by B may contain substituents.

As examples of the aryl radicals represented by A there may be mentioned monocyclic aryl radicals such as phenyl, sulphophenyl, carboxyphenyl, methoxyphenyl, ethoxyphenyl, chlorophenyl, methylphenyl, nitrophenyl, benzeneazophenyl, sulphophenylazophenyl, acetylaminophenyl, benzoylaminophenyl and sulphocarboxyphenyl radicals and bicyclic aryl radicals such as naphthyl, sulphonaphthyl, disulphonaphthyl, methoxynaphthyl and ethoxynaphthyl radicals, but it is preferred that the aryl radical represented by A contains at least one sulphonic acid group.

As examples of the substituents which may be present in the phenylene or naphthylene radical B there may be mentioned alkoxy for example lower alkoxy such as methoxy and ethoxy, alkyl for example lower alkyl such as methyl, carboxy, acylamino such as acetylamino and benzoylamino, and sulpho.

As examples of the substituted phenylene radicals represented by R there may be mentioned 2-sulpho-1:4-phenylene and 2-sulpho-1:3-phenylene, and as examples of the alkyl radicals represented by R' there may be mentioned lower alkyl radicals such as methyl, ethyl, propyl and butyl.

As examples of the radicals and groups represented by Y there may be mentioned alkyl radicals for example lower alkyl radicals such as methyl and ethyl, aryl radicals for example monocyclic aryl radicals such as phenyl and tolyl, alkoxy radicals for example lower alkoxy radicals such as methoxy, propoxy and ethoxy, aryloxy radicals for example monocyclic aryloxy radicals such as phenoxy and sulphophenoxy, alkylmercapto radicals for example lower alkylmercapto radicals such as methylmercapto, arylmercapto radicals for example monocyclic aryl mercapto radicals such as phenylmercapto, and substituted amino groups such as methylamino, ethylamino, propylamino, dimethylamino, diethylamino, dipropylamino, N-methyl-N-ethylamino, N-ethyl-N-propylamino, β-hydroxyethylamino, di(β-hydroxyethyl)amino, phenylamino, 2-sulphophenylamino, 3-sulphophenylamino, 4-sulphophenylamino, disulphophenylamino, 3 - carboxyphenylamino, 4 - carboxyphenylamino, naphthylamino, sulphonaphthylamino, disulphonaphthylamino, benzylamino, piperidyl, N-methyl-N-β-hydroxyethylamino, N-ethyl-N-β-hydroxyethylamino, N-methyl-N-phenylamino, N-ethyl-N-phenylamino, N-β-hydroxyethyl-N-phenylamino, 2:5-dicarboxyphenylamino, N-methyl-N-3'-sulphophenylamino, N-ethyl-N-4'-sulphophenylamino, N-β-hydroxyethyl-N-3'-sulphophenylamino, 3- or 4-methoxyphenylamino, 2-, 3-, or 4-methylphenylamino, 4-chlorophenylamino, 4-methyl-3-sulphophenylamino, 4-chloro-3-sulphophenylamino and 3-carboxy-5-sulphophenylamino, but it is preferred that Y represents a chlorine atom or a sulphophenylamino or a disulphophenylamino group such as a 3:5-disulphophenylamino group.

The whole number represented by $n$ is preferably a whole number not greater than 6 so that when $n$ represents a whole number from 2 to 6 the $C_{n-1}H_{2n-1}$ group represents a lower alkyl radical, or preferably $n$ represents 1 so that the $C_{n-1}H_{2n-1}$ group represents a hydrogen atom. It is also preferred that $m$ and $p$ each represent 1.

According to a further feature of the invention there is provided a process for the manufacture of the new azo dyestuffs as hereinbefore defined which comprises diazotising an amine of the formula:

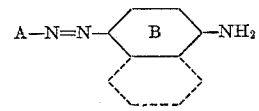

(Formula I)

wherein A and B have the meanings stated above, and coupling the diazo compound so obtained with a coupling component of the formula:

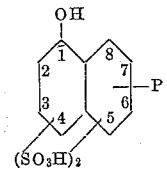

(Formula II)

wherein P has the meaning stated above.

This process of the invention may be conveniently carried out by adding sodium nitrite to a solution or suspension of the amine of Formula I in a dilute aqueous solution of hydrochloric acid, adding the diazo solution or suspension so obtained to an aqueous solution of the coupling component of Formula II, adding sodium carbonate to maintain the pH of the mixture between 6.5 and 7 and filtering off the azo dyestuff which is precipitated. If desired sodium chloride can be added to ensure complete precipitation of all the azo dyestuff.

The amines of Formula I may themselves be obtained by diazotising a primary amine of the formula: A—NH₂ wherein A represents an aryl radical which does not contain a hydroxyl group in an ortho position to the amino group and coupling the diazo compound so obtained with a para coupling amine of the formula:

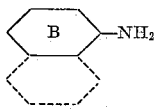

wherein B has the meaning stated above.

As examples of the primary amines of the formula: A—$NH_2$ which may be used to obtain the amines of Formula I used in this process of the invention there may be mentioned aniline, orthanilic acid, metanilic acid, sulphanilic acid, p-toluidine 2-naphthylamine 6- or 8- sulphonic acid, 1-naphthylamine 4-, -5-, -6-, or -7- sulphonic acid, aminoazobenzene, aminoazobenzene disulphonic acid, 2:5-dichloroaniline-4-sulphonic acid, 4-nitroaniline 2-sulphonic acid, 5-chloro-4-methylaniline-2-sulphonic acid, 4-methoxyaniline-2-sulphonic acid, 3-chloro-4-methylaniline 2-sulphonic acid, 4-chloroaniline-2-sulphonic acid, 4-chloro-3-methylaniline-6-sulphonic acid, 4-chloroaniline-3-sulphonic acid, aniline-2:4-disulphonic acid, aniline-2:5-disulphonic acid, anthranilic acid, 5-sulpho-anthranilic acid, 4-sulphoanthranilic acid, 5-nitroanthranilic acid, 6-nitro-3-aminobenzoic acid, 4-acetylamino-2-aminobenzoic acid, 2-methoxy-1-naphthylamine-6-sulphonic acid, 2-ethoxy-1-naphthylamine-6-sulphonic acid, 2 - naphthylamine 1:5-, 3:6-, 4:8-, 5:7- or 6:8-disulphonic acid, 2-naphthylamine-1-sulphonic acid, 4-sulpho-2-aminoanisole, 5-nitro-4-carboxy-2-aminoanisole and 4-nitro-2:5-dicarboxyaniline.

As examples of the para coupling amines which may be used to obtain the amines of Formula I used in this process of the invention there may be mentioned 2-methoxy-5-methylaniline, m-toluidine, 2:5-dimethoxyaniline, 1-naphthylamine, 2-methoxy-1-naphthylamine, aniline, anthranilic acid, o-anisidine, 2-methoxy-1-naphthylamine-6-sulphonic acid, 1-naphthylamine-6-sulphonic acid, 1-naphthylamine-7-sulphonic acid, 4-acetylamino-2-aminoanisole, m-aminoacetanilide, m-benzoylamino-2-aminoanisole and 4-acetylamino-2-aminobenzoic acid.

The coupling components of Formula II may themselves be obtained by treating a compound of the formula:

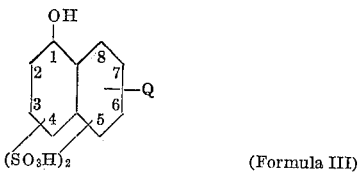

(Formula III)

wherein Q represents a group of the formula:

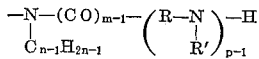

wherein R, R', n, m and p have the meanings stated above, which is attached to the 6- or 7- position of the naphthalene nucleus, with a triazine of the formula:

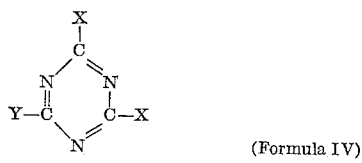

(Formula IV)

wherein X and Y have the meanings stated above.

As examples of the compounds of Formula III which may be used to obtain the coupling components of Formula II used in this process of the invention there may be mentioned 2-amino-5-naphthol-1:7-disulphonic acid, 2-amino-8-naphthol-3:6-disulphonic acid, 2-(4'-amino-3'-sulphopenylamino)-5-naphthol 1:7-disulphonic acid, 2-(4'-amino-3'-sulphophenylamino) - 8-naphthol-3:6-disulphonic acid, 2-(4'-aminobenzoylamino) - 5 - naphthol-1:7 - disulphonic acid, 2-(3'-aminobenzoylamino)-5-naphthol-1:7-disulphonic acid, 2-(4'-aminobenzoylamino)-8-naphthol-3:6-disulphonic acid and 2-(3'-aminobenzoylamino)-8-naphthol-3:6-disulphonic acid.

As examples of the triazines of Formula IV which may be used to obtain the coupling components of Formula II used in this process of the invention there may be mentioned cyanuric chloride, cyanuric bromide, 2-methoxy-4:6-dichloro-1:3:5-triazine, 2-phenyl-4:6-dichloro-1:3:5-triazine, 2-methyl-4:6-dichloro-1:3:5-triazine, 2-amino-4:6-dichloro-1:3:5-triazine, 2-methylamino-4:6-dichloro-1:3:5-triazine, 2-diethylamino-4:6-dichloro-1:3:5-triazine, 2-phenylamino-4:6-dichloro-1:3:5-triazine, 2-(2'-sulphophenylamino)-4:6-dichloro-1:3:5-triazine, 2 - (3'-sulphophenylamino)-4:6-dichloro-1:3:5-triazine, 2 - (4'-sulphophenylamino)-4:6-dichloro-1:3:5-triazine, 2 - thiocyano-4:6 - dichloro-1:3:5-triazine, 2-phenoxy-4:6 - dichloro-1:3:5-triazine and 2-amino-4:6-dibromo-1:3:5-triazine.

According to a further feature of the invention there is provided an alternative process for the manufacture of the new azo dyestuffs, as hereinbefore defined, which comprises treating an azo compound of the formula:

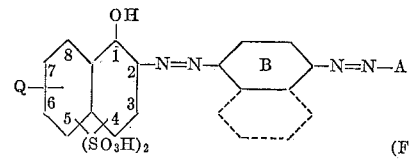

(Formula V)

wherein A, B and Q have the meanings stated above, with a triazine of Formula IV as hereinbefore defined.

This alternative process of the invention may be conveniently carried out by adding an aqueous solution of the azo compound of Formula V to a suspension of the triazine of Formula IV in a mixture of acetone and water, adding sodium carbonate to maintain the pH of the mixture between 5 and 7.5, and filtering off the azo dyestuff which is precipitated. If desired, sodium chloride can be added to ensure complete precipitation of all the azo dyestuff.

The azo compounds of Formula V used in this alternative process of the invention may be obtained by coupling a diazotised amine of Formula I, as hereinbefore defined, with a compound of Formula III, as hereinbefore defined.

According to a further feature of the invention there is provided a modified process for the manufacture of the new azo dyestuffs, as hereinbefore defined, wherein Y represents an alkoxy, aryloxy, arylmercapto or alkylmercapto radical or an amino or substituted amino group, which comprises treating a new azo dyestuff, as hereinbefore defined, wherein Y represents a chlorine or a bromine atom, with a compound of the formula: H.D wherein D represents an alkoxy, aryloxy, arylmercapto or alkylmercapto radical or an amino or substituted amino group.

This modified process of the invention may be conveniently carried out by heating an aqueous solution of a dyestuff wherein Y represents a halogen atom with one molecular proportion of a compound of the formula: H—D, as hereinbefore defined, at a temperature between 40° and 45° C., adding sodium carbonate to maintain the pH of the mixture between 7.0 and 7.2, adding sodium chloride and filtering off the dyestuff which is precipitated.

As examples of compounds of the formula: H—D which may be used in the modified process of the invention there may be mentioned methanol, ethanol, phenol, thiophenol, ammonia, aniline, 2-sulphonaniline, 3-sulphoaniline, 4-sulphonaniline, 3-carboxyaniline, 4-carboxyaniline and 2-naphthylamine 4:8-, 5:7-, 6:8- or 3:6-disulphonic acid.

A preferred class of the new azo dyestuffs, as hereinbefore defined, are those dyestuffs which contain a metallisable group in the arylene residue represented by B, the said metallisable group being in an ortho position to the azo bond which links B with the naphthalene nucleus, as this preferred class of dyestuffs yield metal complexes which, when applied to cellulose textile materials, have excellent fastness to light.

According to a further feature of the invention there are provided as new metal-containing azo dyestuffs the metal complexes of the azo dyestuffs of the formula:

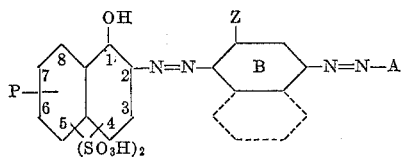

wherein A, B and P have the meanings stated above and Z represents a metallisable group.

As examples of the metallisable groups represented by Z there may be mentioned hydroxy, carboxy, methoxy and carboxymethoxy, and as examples of metals there may be mentioned nickel, cobalt, chromium and preferably copper.

According to a further feature of the invention there is provided a process for the manufacture of the new metal-containing azo dyestuffs, as hereinbefore defined, which comprises treating an aminoazo compound of the formula:

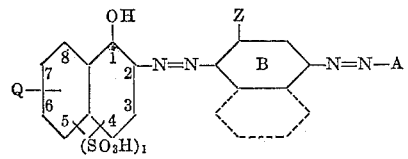

wherein A, B, Z and Q have the meanings stated above, with a metallising agent and with a triazine of Formula IV, as hereinbefore defined.

The aminoazo compound may be treated with the triazine and then with the metallising agent, but it is preferred to treat the aminoazo compound with the metallising agent and subsequently treat the metal complex so obtained with the triazine.

This process of the invention may be conveniently carried out by heating an aqueous solution of the aminoazo compound with an aqueous solution of the metallising agent, adding an aqueous solution of the metal complex so formed to a suspension of the triazine in an aqueous solution of acetone, maintaining the pH of the mixture between 6 and 7 by adding sodium carbonate and filtering off the dyestuff which is precipitated. If desired sodium chloride can be added to ensure complete precipitation of all the dyestuff.

As examples of metallising agents which may be used in this process of the invention there may be mentioned copper sulphate, cuprammonium sulphate, copper acetate, nickel acetate, cobalt sulphate and chromium formate.

As examples of triazines of Formula IV which may be used in this process of the invention there may be mentioned cyanuric bromide, cyanuric chloride, 2-methoxy-4:6-dichloro-1:3:5 - triazine, 2-phenyl-4:6-dichloro-1:3:5-triazine, 2-phenoxy-4:6-dichloro-1:3:5-triazine, 2-amino-4:6-dichloro-1:3:5-triazine, 2-di(β-hydroxyethyl)-amino-4:6-dichloro-1:3:5-triazine, 2 - phenylamino - 4:6-dichloro-1:3:5-triazine, 2(2'-sulphophenylamino)-4:6-dichloro-1:3:5 - triazine, 2-(3'-sulphophenylamino) - 4:6-dichloro-1:3:5 - triazine, 2-(4'-sulphophenylamino)-4:6-dichloro-1:3:5-triazine, 2 - amino-4:6-dibromo-1:3:5-triazine, 2-methylamino-4:6-dichloro-1:3:5-triazine, 2-dimethylamino - 4:6 - dichloro-1:3:5-triazine and 2-thiocyano-4:6-dichloro-1:3:5-triazine.

The aminoazo compounds used in this process of the invention may be obtained by diazotising a primary amine of the formula: A—NH₂, wherein A represents an aryl radical which does not contain a hydroxyl group in an ortho position to the amino group, coupling the diazo compound so formed with a para coupling amine of the formula:

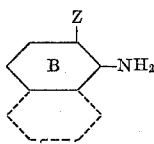

wherein B and Z have the meanings stated above, rediazotising and coupling under alkaline conditions with a compound of Formula III, as hereinbefore defined.

As examples of primary amines of the formula: A—NH₂ which may be used to obtain the aminoazo compounds used in this process of the invention there may be mentioned aniline, orthanilic acid, metanilic acid, sulphanilic acid, 1-naphthylamine 4-, 5-, 6- or 7-sulphonic acid, 2-naphthylamine 6- or 8-sulphonic acid, aminoazobenzene disulphonic acid, 2:5-dichloroaniline -4-sulphonic acid, 4-nitroaniline-2-sulphonic acid, 5-chloro-4-methylaniline-2-sulphonic acid, 4 - methoxyaniline-2-sulphonic acid, 3-chloro-4-methylaniline-2-sulphonic acid, 4-chloroaniline-2-sulphonic acid, 4-chloro-3-methylaniline-6-sulphonic acid, 4-chloroaniline-3-sulphonic acid, aniline-2:4-disulphonic acid, aniline-2:5-disulphonic acid, anthranilic acid, 5-sulphonanthranilic acid, 4-sulphoanthranilic acid, 5-nitroanthranilic acid, 6-nitro-3-aminobenzoic acid, 4-acetylamino-2-aminobenzoic acid, 2-methoxy-1-naphthylamine-6-sulphonic acid, 2 - ethoxy-1-naphthyl-amine-6-sulphonic acid, 2-naphthylamine 1:5-, 3:6-, 4:8-, 5:7- or 6:8-disulphonic acid, 2-naphthylamine-1-sulphonic acid, 4 - sulpho-2-aminoanisole, 5-nitro-4-carboxy-2-aminoanisole and 4-nitro-2:5-dicarboxyaniline.

As examples of the para coupling amines which may be used to obtain the aminoazo compounds used in this process of the invention there may be mentioned 2:5-dimethoxyaniline, 2-methoxy-5-methylaniline, anthranilic acid, 2-methoxy-1-naphthylamine-6-sulphonic acid, 2-ethoxy-1-naphthylamino-6-sulphonic acid, o-anisidine, 4-acetylamino-2-aminoanisole, 4 - acetylamino-2-aminobenzoic acid, 4-methoxy-2-aminophenoxyacetic acid and 4-benzoylamino-2-aminoanisole.

As examples of the compounds of Formula III which may be used to obtain the aminoazo compounds used in this process of the invention there may be mentioned 2-amino-5-naphthol 1:7-disulphonic acid, 2-amino-8-naphthol 3:6-disulphonic acid, 2-(4'-amino-3'-sulphophenylamino)-5-naphthol 1:7-disulphonic acid, 2-(4'-amino-3'-sulphophenylamino)-8-naphthol 3:6-disulphonic acid, 2-(4'-aminobenzoylamino)-5-naphthol 1:7-disulphonic acid, 2 - (4'-aminobenzoylamino)-8-naphthol 3:6 - disulphonic acid, 2 - (3'-aminobenzoylamino)-5-naphthol 1:7 - disulphonic acid and 2-(3'-aminobenzoylamino)-8-naphthol 3:6-disulphonic acid.

According to a further feature of the invention there is provided a modified process for the manufacture of the new metal-containing azo dyestuffs, as hereinbefore defined, wherein Y represents an alkoxy, aryloxy, alkylmercapto or arylmercapto radical or an amino or substituted amino group, which comprises treating a new metal-containing azo dyestuff, as hereinbefore defined, wherein Y represents a chlorine or a bromine atom, with a compound of the formula: DH as hereinbefore defined.

This modified process of the invention may be conveniently carried out by heating an aqueous solution of a new metal-containing dyestuff wherein Y represents a halogen atom with one molecular proportion of a compound of the formula: D—H, as hereinbefore defined, at a temperature between 40° and 50° C. adding sodium carbonate to maintain the pH of the mixture between 7.0 and 7.2, adding sodium chloride and filtering off the dyestuff which is precipitated.

It is generally preferable to isolate those new azo dyestuffs, as hereinbefore defined, and those new metal-containing azo dyestuffs, as hereinbefore defined, wherein Y represents a chlorine or a bromine atom, from the medium in which they have been formed at a pH from 6 to 8 and it has been found that the loss of halogen atoms from the triazine ring present in these dyestuffs can be reduced considerably by the addition of certain buffering agents which give a pH value between 6 and 8 and in particular by those which give a pH of about 6.5. The buffering agents may be added at any stage during the manufacture of these new dyestuffs but it is preferred to add the buffering agent just before the dyestuff is isolated and to subsequently dry the dyestuff in the presence of such a buffering agent. As examples of suitable buffering agents which can be used there may be mentioned mixtures of disodium hydrogen phosphate and sodium dihydrogen phosphate or potassium dihydrogen phosphate and mixtures of sodium diethylmetanilate and sodium hydrogen sulphate.

The new azo dyestuffs and new metal-containing azo dyestuffs, as hereinbefore defined, are valuable for colouring cellulose textile materials, for example cotton, viscose rayon and linen textile materials. For colouring the cellulose textile materials the new dyestuffs may be applied by either a dyeing or a printing method, preferably in conjunction with a treatment with an acid-binding agent, for example by the methods disclosed in British specification No. 797,946. When so applied to cellulose textile materials the new dyestuffs, as hereinbefore defined, yield reddish-blue to grey shades possessing very good fastness to wet treatments such as washing.

The invention is illustrated but not limited by the following examples in which the parts and percentages are by weight:

Example 1

Diazotised orthanilic acid is coupled with 2-methoxy-5-methylaniline and the aminoazo compound so obtained is diazotised and coupled under alkaline conditions with an equimolecular proportion of 2-amino-5-naphthol-1:7-disulphonic acid.

A solution of 11.8 parts of the trisodium salt of the above amino-disazo compound in 400 parts of water is added with stirring to a suspension of 3.3 parts of cyanuric chloride in a mixture of 50 parts of acetone, 180 parts of ice and 100 parts of water, the temperature being maintained between 0° and 5° C. by external cooling. The mixture is then stirred for 1½ hours, and 12 parts of a 10% aqueous solution of sodium carbonate are then added. 7.2 parts of sodium diethylmetanilate, 0.8 part of sodium hydrogen sulphate and 40 parts of sodium chloride are added and the precipitated dyestuff is then filtered off. The dyestuff paste so obtained is washed with 200 parts of acetone, and the dyestuff paste is then mixed with 0.9 part of sodium diethyl metanilate and 0.1 part of sodium hydrogen sulphate and dried at 20° C. On analysis the dyestuff composition so obtained is found to contain 1.7 atoms of organically bound chlorine for each disazo molecule present. When applied to cellulose textile materials in conjunction with a treatment with an acid-binding agent the dyestuff yields violet shades possessing good fastness to washing and to light.

Example 2

In place of the 11.8 parts of the trisodium salt of the amino-disazo compound used in Example 1 there are used 11.8 parts of the trisodium salt of the amino-disazo compound which is obtained by coupling diazotised orthanilic acid with 2-methoxy-5-methylaniline, re-diazotising and coupling under alkaline conditions with 2-amino-8-naphthol 3:6-disulphonic acid.

On analysis the dyestuff composition so obtained is found to contain 2.1 atoms of organically bound chlorine for each disazo molecule present.

When applied to cellulose textile materials in conjunction with a treatment with an acid-binding agent the dyestuff yields violet shades possessing very good fastness to washing and to light.

Example 3

Diazotised orthanilic acid is coupled with 2-methoxy-5-methylaniline and the aminoazo compound so obtained is diazotised and coupled under alkaline conditions with an equimolecular proportion of 2-amino-5-naphthol 1:7-disulphonic acid.

A mixture of 18 parts of the trisodium salt of the above amino-diazo compound, 400 parts of water, 10 parts of diethanolamine, 30 parts of a 2 N aqueous solution of copper sulphate and 15 parts of a concentrated aqueous solution of ammonia is stirred at a temperature between 95° and 100° C. for 15 hours. 40 parts of sodium chloride are then added and the precipitated metal compound is filtered off and dried. A solution of 21 parts of this metal compound in 200 parts of water is added with stirring to a suspension of 5.2 parts of cyanuric chloride in a mixture of 50 parts of acetone, 100 parts of ice and 50 parts of water the temperature being maintained between 0° and 5° C. by external cooling. The mixture is stirred for 1 hour and 11 parts of a 10% aqueous solution of sodium carbonate are then added. 9 parts of sodium diethylmetanilate, 1 part of sodium hydrogen sulphate and 15 parts of sodium chloride are then added and the precipitated dyestuff is filtered off. The dyestuff paste is then washed with 400 parts of acetone and the paste mixed with 1.8 parts of sodium diethyl metanilate and 0.2 part of sodium hydrogen sulphate and dried at 20° C. On analysis the dyestuff composition so obtained is found to contain 2.1 atoms of organically bound chlorine for each disazo molecule present. When applied to cellulose textile materials in conjunction with a treatment with an acid-binding agent the dyestuff gives blue shades possessing very good fastness to washing and to light.

The following table gives further examples of the shades obtained on cellulose textile materials from the copper-containing dyestuffs obtained when the aminodisazo compound used in Example 3 is replaced by the aminodisazo compound obtained by diazotising the primary amine listed in the second column of the table, coupling with the para coupling amine listed in the third column of the table, diazotising and coupling with the coupling component listed in the fourth column of the table.

| Example | Primary amine | Paracoupling amine | Coupling component | Shade on cellulose textile material |
|---|---|---|---|---|
| 4 | aniline 2:4-disulphonic acid. | 2-methoxy-5-methyl aniline. | 2-amino-5-naphthol 1:7-disulphonic acid. | Navy blue. |
| 5 | 2-naphthylamine 6:8-disulphonic acid. | ---do--- | ---do--- | Blue. |
| 6 | orthanilic acid. | o-anisidine | ---do--- | Do. |
| 7 | aniline-2:5-disulphonic acid. | ---do--- | ---do--- | Do. |
| 8 | 2-naphthylamine-6:8-disulphonic acid. | ---do--- | ---do--- | Reddish-blue. |
| 9 | 2-naphthylamine 5:7-disulphonic acid. | ---do--- | ---do--- | Blue. |
| 10 | orthanilic acid. | 2-methoxy-5-methylaniline. | 2-amino-8-naphthol 3:6-disulphonic acid. | Do. |
| 11 | 6-chloro-3-sulpho-4-toluidine. | ---do--- | ---do--- | Do. |
| 12 | 2-naphthylamine 6:8-disulphonic acid. | ---do--- | ---do--- | Do. |
| 13 | 6-chloro-3-sulpho-4-toluidine. | o-anisidine | ---do--- | Do. |
| 14 | 2-naphthylamine 6:8-disulphonic acid. | ---do--- | ---do--- | Do. |

| Example | Primary amine | Paracoupling amine | Coupling component | Shade on cellulose textile materials |
|---|---|---|---|---|
| 15 | p-nitroaniline-o-sulphonic acid. | 2-methoxy-5-methylaniline. | 2-amino-5-naphthol-1:7-disulphonic acid. | Bluish-grey. |
| 16 | 4-nitro-4'-aminostilbene-2:2'-disulphonic acid. | anthranilic acid. | ----do---- | Violet. |
| 17 | aniline-2:5-disulphonic acid. | 2-methoxy-5-methylaniline. | ----do---- | Navy-blue. |
| 18 | ----do---- | ----do---- | 2-amino-8-naphthol-3:6-disulphonic acid. | Blue. |
| 19 | ----do---- | 2-ethoxy-1-naphthylamine-6-sulphonic acid. | 2-amino-5-naphthol-1:7-disulphonic acid. | Greenish-blue. |
| 20 | ----do---- | 2-methoxy-5-methylaniline. | 2-(4'-amino-3'-sulphophenylamino)-5-naphthol-1:7-disulphonic acid. | Reddish-blue. |
| 21 | ----do---- | ----do---- | 2-(4'-aminobenzoylamino)-5-naphthol-1:7-disulphonic acid. | Grey. |
| 22 | 2-naphthylamine-5:7-disulphonic acid. | ----do---- | 2-amino-5-naphthol-1:7-disulphonic acid. | Bluish-grey. |
| 23 | ----do---- | anthranilic acid. | ----do---- | Violet. |
| 24 | ----do---- | ----do---- | 2-amino-8-naphthol-3:6-disulphonic acid. | Reddish-violet. |
| 25 | anthranilic acid. | 2-methoxy-5-methylaniline. | ----do---- | Grey. |
| 26 | 2-napththylamine-3:6:8-trisulphonic acid. | ----do---- | 2-amino-5-naphthol-1:7-disulphonic acid. | Bluish-violet. |
| 27 | 5-aminoisophthalic acid. | ----do---- | ----do---- | Navy blue. |
| 28 | 2-aminoterephthalic acid. | ----do---- | ----do---- | Do. |
| 29 | 2-naphthylamine-3:6:8-trisulphonic acid. | ----do---- | 2-(3'-aminophenylamino)-5-naphthol-1:7-disulphonic acid. | Blue. |
| 30 | ----do---- | ----do---- | 2-(4'-aminophenylamino)-5-naphthol-1:7-disulphonic acid. | Do. |
| 31 | 4-aminoazobenzene-3:4'-disulphonic acid. | 2:5-dimethoxyaniline. | 2-amino-5-naphthol-1:7-disulphonic acid. | Bluish-grey. |
| 32 | 2-naphthylamine-1:5-disulphonic acid. | 2-methoxy-5-methylaniline. | ----do---- | Blue. |
| 33 | 5-sulphoanthranilic acid. | ----do---- | ----do---- | Do. |
| 34 | 4-nitro-4'-aminostilbene-2:2'-disulphonic acid. | anthranilic acid. | 2-amino-8-naphthol-3:6-disulphonic acid. | Brown. |
| 35 | 1-amino-8-(p-toluenesulphonyloxy)-naphthalene-3:6-disulphonic acid. | 2-methoxy-5-methylaniline. | 2-amino-5-naphthol-1:7-disulphonic acid. | Grey. |

The following table gives further examples of the shades obtained on cellulose textile materials from other dyestuffs of the invention which are obtained by replacing the 11.8 parts of the trisodium salt of the aminodisazo compound used in Example 1 by an equivalent amount of the sodium salt of the aminoazo compound which is obtained by diazotising the primary amine listed in the second column of the table, coupling with the paracoupling amine listed in the third column of the table, diazotising and coupling with the coupling component listed in the fourth column of the table.

| Example | Primary amine | para-coupling amine | coupling component | Shade on cellulose textile materials |
|---|---|---|---|---|
| 36 | 1-amino-8-(p-toluenesulphonyloxy)naphthaene-3:6-disulphonic acid. | 2-methoxy-5-methylaniline. | 2-amino-5-naphthol-1:7-disulphonic acid. | Bluish violet. |
| 37 | aniline-2:5-disulphonic acid. | ----do---- | ----do---- | Do. |
| 38 | ----do---- | ----do---- | 2-amino-8-naphthol-3:6-disulphonic acid. | Do. |
| 39 | ----do---- | 2-ethoxy-1-naphthylamine-6-sulphonic acid. | ----do---- | Reddish-blue. |
| 40 | 4-nitro-4'-aminostilbene-2:2'-disulphonic acid. | anthranilic acid. | ----do---- | Greyish-brown. |
| 41 | aniline-2:5-disulphonic acid. | 2-methoxy-5-methylaniline. | 2-(4'-amino-3'-sulphophenylamino)-5-naphthol-1:7-disulphonic acid. | Bluish-violet. |
| 42 | ----do---- | ----do---- | 2-(4'-aminobenzoylamino)-5-naphthol-1:7-disulphonic acid. | Reddish-violet. |
| 43 | 4-aminoazobenzene-3:4'-disulphonic acid. | 2-methoxy-1-naphthylamine-6-sulphonic acid. | 2-amino-5-naphthol-1:7-disulphonic acid. | Greenish-blue. |
| 44 | ----do---- | ----do---- | 2-amino-8-naphthol-3:6-disulphonic acid. | Do. |
| 45 | aniline-2:5-disulphonic acid. | α-naphthylamine. | 2-amino-5-naphthol-1:7-disulphonic acid. | Violet. |
| 46 | 4-aminoazobenzene-3:4'-disulphonic acid. | 2-methoxy-5-methylaniline. | ----do---- | Red. |

*Example 47*

In place of the 21 parts of the metal compound used in Example 3 there are used 24 parts of the cobalt complex obtained by coupling diazotised 4-nitro-4'-aminostilbene-2:2'-disulphonic acid with anthranilic acid in acid medium, diazotising the aminomonoazo compound so obtained, coupling the resultant diazo compound with 2-amino-5-naphthol-1:7 disulphonic acid in alkaline medium and heating the aminodisazo compound so obtained with an aqueous solution of cobalt acetate.

On analysis the dyestuff so obtained is found to contain 1.9 atoms of organically bound chlorine for each disazo molecule present. When applied to cellulose textile materials in conjunction with a treatment with an acid-binding agent the dyestuff yields brown shades possessing good fastness to washing and to light.

*Example 48*

In place of the 21 parts of the metal compound used in Example 3 there are used 24 parts of the chromium complex which is obtained by coupling diazotised 4-nitro-4'-aminostilbene-2:2'-disulphonic acid with anthranilic acid in acid medium, diazotising the amino monoazo compound so obtained, coupling the resultant diazo compound with 2-amino-5-naphthol-1:7-disulphonic acid in alkaline medium and heating the aminodisazo compound so obtained with a solution of chromium acetate.

On analysis the dyestuff so obtained is found to contain 1.8 atoms of organically bound chlorine for each disazo molecule present. When applied to cellulose textile materials in conjunction with a treatment with an acid-binding agent the dyestuff yields rubine shades possessing good fastness to washing and to light.

Example 49

In place of the 21 parts of the metal compound used in Example 3 there are used 25 parts of the nickel complex obtained by coupling diazotised 4-nitro-4'-aminostilbene-2:2'-disulphonic acid with anthranilic acid in acid medium, diazotising the aminomonoazo compound so obtained, coupling the resultant diazo compound with 2-amino-5-naphthol-1:7-disulphonic acid in alkaline medium and heating the aminodisazo compound so obtained with a solution of nickel acetate.

On analysis the dyestuff so obtained is found to contain 2.1 atoms of organically bound chlorine for each disazo molecule present. When applied to cellulose textile materials in conjunction with a treatment with an acid-binding agent the dyestuff yields maroon shades possessing good fastness to washing and to light.

Example 50

In place of the 5.2 parts of cyanuric chloride used in Example 3 there are used 9.3 parts of cyanuric bromide. On analysis the dyestuff composition so obtained is found to contain 1.9 atoms of organically bound bromine for each disazo molecule present. When applied to cellulose textile materials in conjunction with a treatment with an acid-binding agent the dyestuff yields blue shades possessing good fastness to washing and to light.

Example 51

Diazotised aniline-2:5-disulphonic acid is coupled with 2-methoxy-5-methylaniline, the aminoazo compound so obtained is diazotised and coupled under alkaline conditions with an equimolecular proportion of 2-amino-5-naphthol-1:7-disulphonic acid and the aminodisazo compound so obtained is converted to its copper complex by heating it for 20 hours at a temperature between 95° and 100° C. with an aqueous solution of cuprammonium sulphate.

A solution of 21.5 parts of the tetra-sodium salt of the copper containing aminodisazo compound so obtained in 250 parts of water is added with stirring to a suspension of 4.8 parts of cyanuric chloride in a mixture of 50 parts of acetone, 100 parts of water and 200 parts of ice, the temperature of the mixture being maintained between 0° and 5° C. by the addition of ice. The mixture is stirred for 1 hour at a temperature between 0° and 5° C., and the mixture is then neutralised to pH 6.8 by the addition of 9 parts of a 10% aqueous solution of sodium carbonate. A solution of 7.8 parts of the disodium salt of aniline-3:5-disulphonic acid in 10 parts of water is then added and the mixture is stirred at a temperature between 40° and 45° C. for 3 hours, the pH of the mixture being maintained at 7 by the addition of a 10% aqueous solution of sodium carbonate. 90 parts of sodium chloride are then added and the dyestuff which is precipitated is filtered off and dried.

On analysis the dyestuff so obtained is found to contain 0.9 atom of organically bound chlorine for each disazo molecule present. When applied to cellulose textile materials in conjunction with a treatment with an acid-binding agent the dyestuff yields navy-blue shades of excellent fastness to washing and to light.

Example 52

In place of the 7.8 parts of the disodium salt of aniline-3:5-disulphonic acid used in Example 51 there are used 7.5 parts of the disodium salt of 5-sulpho-2-aminobenzoic acid. On analysis the dyestuff so obtained is found to contain 1.0 atom of organically bound chlorine for each disazo molecule present. When applied to cellulose textile materials in conjunction with a treatment with an acid-binding agent the dyestuff yields navy-blue shades possessing good fastness to washing and to light.

Example 53

In place of the 7.8 parts of the disodium salt of aniline-3:5-disulphonic acid used in Example 51 there are used 6.2 parts of the sodium salt of m-aminobenzene sulphonic acid. On analysis the dyestuff so obtained is found to contain 0.93 atom of organically bound chlorine for each disazo molecule present. When applied to cellulose textile materials in conjunction with a treatment with an acid-binding agent the dyestuff yields navy blue shades possessing good fastness to washing and to light.

Example 54

In place of the 7.8 parts of the disodium salt of aniline-3:5-disulphonic acid used in Example 51 there is used a mixture of 3.9 parts of the disodium salt of aniline-3:5-disulphonic acid and 3.7 parts of the disodium salt of 5-sulpho-2-aminobenzoic acid. On analysis the dyestuff so obtained is found to contain 0.98 atom of organically bound chlorine for each disazo molecule present. When applied to cellulose textile materials in conjunction with a treatment with an acid-binding agent the dyestuff yields navy blue shades possessing excellent fastness to washing and to light.

Example 55

In place of the 21.5 parts of the tetrasodium salt of the copper containing aminodisazo compound used in Example 51 there are used 21.5 parts of the tetrasodium salt of the copper complex which is obtained by coupling diazotised aniline-2:4-disulphonic acid with 2-methoxy-5-methylaniline, diazotising the aminoazo compound so obtained, coupling under alkaline conditions with an equimolecular proportion of 2-amino-5-naphthol-1:7-disulphonic acid and heating the aminodisazo compound so obtained with an aqueous solution of cuprammonium sulphate for 20 hours at a temperature between 95° C. and 100° C., and in place of the 7.8 parts of the disodium salt of aniline-3:5-disulphonic acid used in Example 51 there are used 6.2 parts of the sodium salt of m-aminobenzene sulphonic acid. On analysis the dyestuff so obtained is found to contain 0.94 atom of organically bound chlorine for each disazo molecule present. When applied to cellulose textile materials in conjunction with a treatment with an acid-binding agent the dyestuff yields navy blue shades which are fast to washing and to light.

Example 56

In place of the 7.8 parts of the disodium salt of aniline-3:5-disulphonic acid used in Example 51 there are used 10 parts of the disodium salt of 1-amino-8-naphthol-3:6-disulphonic acid. The dyestuff so obtained when applied to cellulose textile materials in conjunction with a treatment with an acid-binding agent yields navy blue shades possesssing excellent fastness to wet treatments.

Example 57

In place of the 7.8 parts of the disodium salt of aniline-3:5-disulphonic acid used in Example 51 there are used 11.8 parts of the trisodium salt of 2-naphthylamine-3:6:8-trisulphonic acid. The dyestuff so obtained when applied to cellulose textile materials in conjunction with a treatment with an acid-binding agent yields navy-blue shades possessing excellent fastness to wet treatments.

Example 58

In place of the 7.8 parts of the disodium salt of aniline-3:5-disulphonic acid used in Example 51 there are used 8 parts of the disodium salt of 2-aminophenol-4:6-disulphonic acid. The dyestuff so obtained when applied to cellulose textile materials in conjunction with a treatment with an acid-binding agent yields navy blue shades possessing excellent fastness to wet treatments.

Example 59

Diazotised aniline-2:5-disulphonic acid is coupled with 2-methoxy-5-methylaniline, the aminoazo compound so obtained is diazotised and coupled under alkaline conditions with an equimolecular proportion of 2-amino-5-naphthol-1:7-disulphonic acid and the resultant aminodisazo compound is converted to the copper complex by heating it with an aqueous solution of cuprammonium sulphate for 20 hours at a temperature between 95° and 100° C.

A solution of 21 parts of the tetrasodium salt of the above copper complex in 230 parts of water is added with stirring to a solution of 8.8 parts of the sodium salt of 2-(3'-sulphoanilino)-4:6-dichlorotriazine in a mixture of 120 parts of water and 40 parts of acetone and the mixture is then stirred at a temperature between 40° and 45° C. for 2½ hours, the pH of the mixture being maintained at 7 by the addition of a 10% aqueous solution of sodium carbonate. 80 parts of sodium chloride are then added and the dyestuff which is precipitated is filtered off, washed with 10 parts of water and dried. On analysis the dyestuff so obtained is found to contain 0.9 atom of organically bound chlorine for each disazo molecule present. When applied to cellulose textile materials in conjunction with a treatment with an acid-binding agent the dyestuff yields navy blue shades possessing good fastness to washing and to light.

*Example 60*

A solution of 10 parts of the disodium salt of 2-amino-5-naphthol-1:7-disulphonic acid in 40 parts of water is added with stirring to a suspension of 5.2 parts of cyanuric chloride in a mixture of 40 parts of acetone, 50 parts of water and 50 parts of ice. The mixture so obtained is then stirred for ½ hour at a temperature between 0° and 2° C. and 7.5 parts of a 10% aqueous solution of sodium carbonate are then added. An aqueous suspension of diazotised 4-amino-2-methyl-5-methoxy-1:1'-azo-benzene-2':5'-disulphonic acid (which is obtained by adding a solution of 11.1 parts of the disodium salt of the above amino-azo compound and 1.9 parts of sodium nitrite in 130 parts of water to a mixture of 12 parts of a concentrated aqueous solution of hydrochloric acid and 200 parts of ice), is then added during 5 minutes while the temperature of the mixture is maintained between 0° and 3° C. 20 parts of sodium acetate crystals are then added during 10 minutes and the mixture is stirred for 20 hours at a temperature between 0° and 3° C. The pH of the mixture is then raised to 7 by the addition of sodium carbonate and sodium chloride is added to give a concentration of 200 grams per litre. The dyestuff which is precipitated is then filtered off, washed with 15 parts of a 10% aqueous brine solution and dried. On analysis the dyestuff so obtained is found to contain 1.8 atoms of organically bound chlorine for each disazo molecule present. When applied to cellulose textile materials in conjunction with a treatment with an acid-binding agent the dyestuff yields blue-violet shades possessing good fastness to washing and to light.

What I claim is:
1. Dyes of the formula:

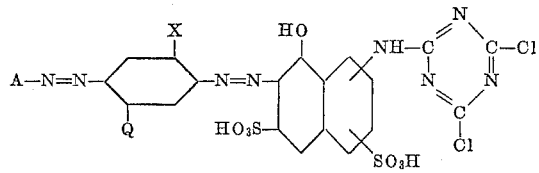

wherein A is selected from the class consisting of monosulphophenyl, disulphophenyl, monocarboxyphenyl, sulphocarboxyphenyl, dicarboxyphenyl, nitrosulphophenyl, methylchlorosulphophenyl, disulphonaphthyl and trisulphonaphthyl, X is selected from the class consisting of carboxy and methoxy, Q is selected from the class consisting of hydrogen, methyl and methoxy, the triazinylamino group is attached to one of the 6 and 7 positions of the naphthalene nucleus relative to the hydroxyl group, and the 1:1 copper complexes of these dyes.

2.

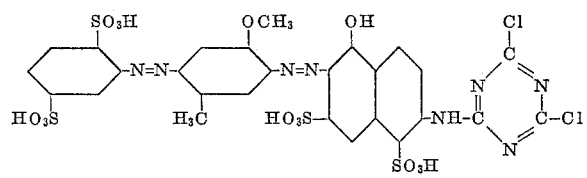

3. The 1:1 copper complex of the dyestuff of claim 2.

4.

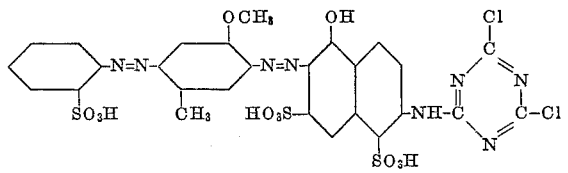

References Cited in the file of this patent

UNITED STATES PATENTS

| | | |
|---|---|---|
| 2,860,128 | Gunst | Nov. 11, 1958 |
| 2,891,941 | Fasciati et al. | June 23, 1959 |
| 2,951,071 | Tilley | Aug. 30, 1960 |
| 2,993,038 | Fasciati et al. | July 18, 1961 |